(12) United States Patent
Wu et al.

(10) Patent No.: US 6,809,921 B2
(45) Date of Patent: Oct. 26, 2004

(54) MECHANISM FOR ATTACHING A DETACHABLE PANEL TO A HOUSING OF A PDA

(75) Inventors: James Wu, I-Lan Hsien (TW); Chien-Ming Tseng, Taipei Hsien (TW)

(73) Assignee: High Tech Computer Corp., Tao-Yuan (TW)

(*) Notice: Subject to any disclaimer, the term of this patent is extended or adjusted under 35 U.S.C. 154(b) by 38 days.

(21) Appl. No.: 10/249,497

(22) Filed: Apr. 15, 2003

(65) Prior Publication Data

US 2004/0085717 A1 May 6, 2004

(30) Foreign Application Priority Data

Nov. 1, 2002 (TW) ........................................ 91217606 U

(51) Int. Cl.[7] ................................................. H04B 1/38
(52) U.S. Cl. ........................ 361/683; 361/684; 361/686; 455/90; 455/128; 379/433.11
(58) Field of Search ................................. 361/683–687; 455/90, 128, 347, 348, 351, 559, 566, 575; 379/433, 428, 439, 441, 369, 568, 440, 451, 452, 453, 633.11; D14/138, 247, 250; 345/168–172, 905

(56) References Cited

U.S. PATENT DOCUMENTS

| | | | |
|---|---|---|---|
| 6,347,218 B1 * | 2/2002 | Fuhrmann et al. | 455/90.1 |
| 6,574,098 B2 * | 6/2003 | Netzel et al. | 361/683 |
| 2002/0042291 A1 * | 4/2002 | Lahteenmaki et al. | 455/566 |
| 2003/0186729 A1 * | 10/2003 | Engstrom et al. | 455/575.8 |

* cited by examiner

Primary Examiner—Michael Datskovsky
(74) Attorney, Agent, or Firm—Winston Hsu

(57) ABSTRACT

A PDA includes a housing and a detachable panel. An exterior surface of the housing has an engaging sink and a dimple. The detachable panel has a hook for locking onto the engaging sink and a cylindrical shaft protruding from the detachable panel for engaging with the dimple so as to prevent lateral movement of the detachable panel with respect to the housing.

6 Claims, 4 Drawing Sheets

MECHANISM FOR ATTACHING A DETACHABLE PANEL TO A HOUSING OF A PDA

BACKGROUND OF INVENTION

1. Field of the Invention

The present invention relates to a PDA (Personal Data Assistant). More specifically, a PDA has a detachable panel is disclosed.

2. Description of the Prior Art

The demands of modern society often require constant availability of electronic devices such as a PDA. As the name Personal Data Assistant implies, a PDA can provide invaluable technical benefits to a user.

In addition to technical requirements placed upon the user, modern society also encourages individuality expressed through personally selected colors and designs of nearly every object manufactured, including PDAs. Users demand a choice of colors and designs and preferably a choice that can be quickly and easily changed according to the current preference of the user.

To better accommodate demands of users for choice and fashion, PDAs with detachable decorative side panels were introduced. When the user wishes to change the color or design of his or her PDA, the user can detach the decorative side panel and replace the decorative side panel with one more in line with his or her needs at the time.

Please refer to FIG. 1 of a side view of an attachment mechanism for attaching a detachable panel 15 to a housing 32 of a PDA 10 according to prior art. The PDA of FIG. 1 was owned by the same assignee as that of the prevent invention at the time of the present invention.

The detachable panel 15 comprises a fixing hook 25 and at least one L-shaped engaging hook 20. The lower portion of the engaging hook 20 is parallel to the detachable panel 15. The fixing hook 25 is of a horizontally rectangular shape and protrudes from the same side of the detachable panel 15 as the engaging hook 20. Additionally, the fixing hook 25, if viewed from the side, has a trapezoidal shape with an increasing width toward the end of the fixing hook 25 that is away from the detachable panel 15.

The housing 32 comprises a recess 34 disposed on an exterior surface of the housing 32 and the recess 34 extends to one end of the housing 32. The recess 34 is formed in the shape and size of the detachable panel 15 and comprises at least one engaging sink 22 and a fixing sink 27.

The engaging sink 22 is a depression or hole within the recess 34 of a size and shape such that the L-shaped engaging hook 20 can fully be contained within the engaging sink 22. A portion of the recess 34 surrounding the engaging sink 22 is formed to fit between the extended lower portion of the engaging hook 20 and the detachable panel 15, holding the detachable panel 15 against a bottom of the recess 34. The fixing sink 27 is a depression or hole of a shape and size allowing entry of the fixing hook 25.

The detachable panel 15 is attached to the PDA 10 by sliding the detachable panel 15 along the recess 34 in the direction indicated by the arrow A in FIG. 1. During the sliding process, the engaging hook 20 enters the engaging sink 22 and grips a portion of the recess surface adjacent to the engaging sink 22. When the engaging hook 20 engages fully with the engaging sink 22, the flexible detachable panel 15 is deformed upward over the fixing hook 25 because the lower, protruding portion of the fixing hook 25 is not yet lined up with the fixing sink 27 and cannot enter the fixing sink 27. Therefore, the user needs to push down on a top surface of the detachable panel 15 in a direction shown by the arrow B, further deforming the detachable panel 15 until the protruding lower portion of the fixing hook 25 tilts enough to allow the fixing hook 25 to snap into the fixing sink 27. It should be noted that because the detachable panel 15 and the recess 34 both extend to the end of the housing 32, that the edges of the recess 34 are unable to prevent the detachable panel from moving laterally and the engaging hook 20 from becoming detached from the engaging sink 22. Instead, the engagement of the fixing hook 25 and the fixing sink 27 prevent the engaging hook 20 from becoming detached from the engaging sink 22.

The housing 32 of the PDA 10 also comprises an open hole 35 in the end of the housing 32 and touching the recess 34. The open hole 35 is a depression in the housing 32 provided to allow detachment of the detachable panel 15 from the PDA 10. A tip of an appropriate instrument, such as a stylus of a pen, can be inserted into the open hole 35 between the housing 32 and the detachable panel 15. By pushing the detachable panel 15 further into the recess 34 with the stylus, the flexibility of the detachable panel 15 allows the stylus to deform the detachable panel 15 enough to pull either the engaging hook 20 out of the engaging sink 22 or the fixing hook 25 out of the fixing sink 27, allowing the detachable panel 15 to be removed from the housing 32 of the PDA 10.

The prior art mechanism for attaching and detaching the detachable panel 15 to the housing 32 of the PDA 10 functions to firmly retain the detachable panel 15 in place. However, both the attachment and detachment procedures require multiple steps by the user and deformations of and possible damage to the detachable panel 15. A simpler, one step procedure to attach or detach the detachable panel 15 would reduce possible damage to the detachable panel 15, would make it more convenient for users to express their choice of colors and designs, and may reduce manufacturing costs because convenience of use may lead to increased sales.

SUMMARY OF INVENTION

It is therefore a primary objective of the claimed invention to solve the above-mentioned problems by introducing a simplified attachment mechanism for attaching a detachable panel to a housing of a PDA.

The claimed invention includes a housing of a PDA and a detachable panel. The PDA has a recess in the shape of the detachable panel for accommodating the detachable panel. Within the recess is an engaging sink and a dimple. The detachable panel includes an engaging hook and a locating shaft.

The detachable panel sides lengthwise into the recess. During the sliding process, the engaging hook enters and grips the engaging sink. When the engaging hook and the engaging sink are fully coupled, elasticity in the detachable panel causes the perpendicular locating shaft to enter the dimple. The dimple effectively prevents lateral movement of the detachable panel relative to the PDA and the engaging hook temporarily fixes the detachable panel to the PDA.

The PDA also has an open hole located at an end of the recess nearest the locating shaft. Insertion of a pen stylus into the open hole allows the lifting of the locating shaft out of the dimple and the detachable panel can be slid along the recess to disengage the engaging hook from the engaging sink, detaching the detachable panel from the PDA.

It is an advantage that the claimed attachment mechanism allows for quick and easy attachment and detachment of a detachable panel to and from a PDA without excess deformation and possible damage to the detachable panel. The simplified procedures improve convenience for the user and help assure detachable PDAs give the user the choice that is demanded.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
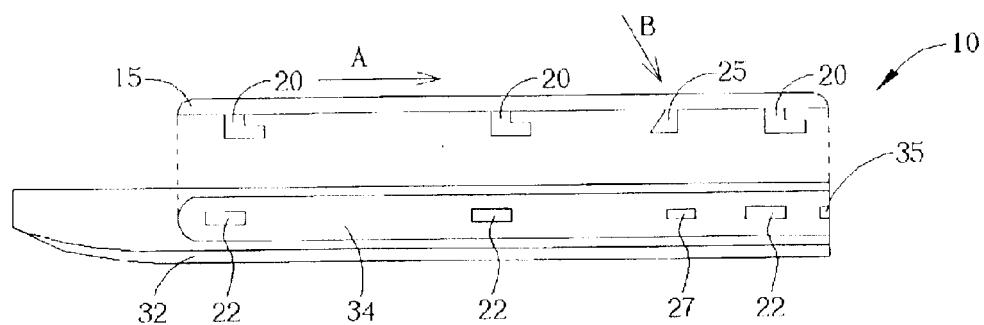
FIG. 1 is a side view of an attachment mechanism for attaching a detachable panel to a housing of a PDA according to a prior art.
Figure 2:
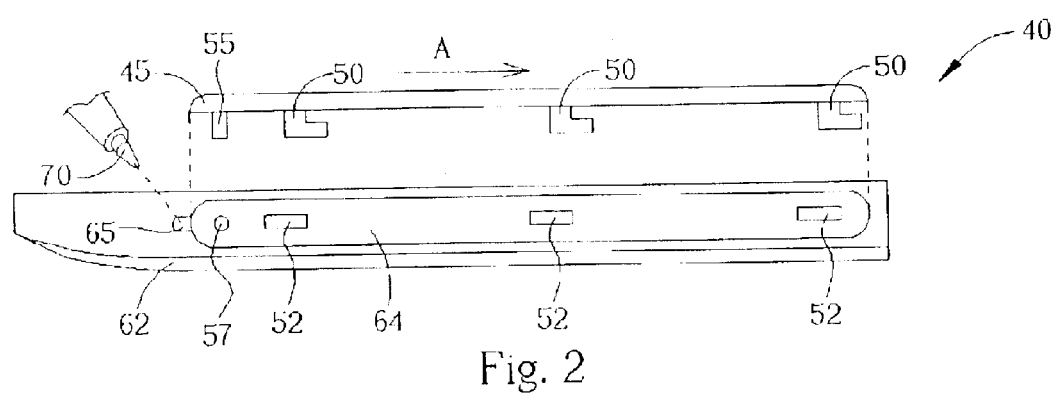
FIG. 2 is a side view of an attachment mechanism for attaching a detachable panel to a housing of a PDA according to the present invention.

Please refer to FIG. 2, FIG. 2 a side view of an attachment mechanism according to the present invention. The preferred embodiment of a PDA 40 comprises a housing 62 and a detachable panel 45.

The detachable panel 45 comprises a locating shaft 55 and at least one L-shaped engaging hook 50. The lower portion of the engaging hook 50 formed approximately parallel to the detachable panel 45 and pointing in a direction away from the locating shaft 55. The locating shaft 55 is of substantially cylindrical shape and protrudes from the detachable panel 45 approximately perpendicular to the detachable panel 45 and from the same side of the detachable panel 45 as the engaging hook 50.

The detachable panel 45 is of a thickness approximately equal to the depth of the recess 64 and may be made of nearly any material such as metal or plastic as long as the material is hard enough to form a strong connection and yet flexible enough to allow a little bending during a removal process. Of course, being detachable, the detachable panel 45 may be made of any of a variety of colors and patterns and may include a sculptured surface.

The housing 62 comprises a recess 64 disposed on an exterior surface of the housing 62, in this embodiment the exterior surface is a side of the housing 62 but is not limited to being as such. The recess 64 is formed in the shape of the detachable panel 4S and comprises at least one engaging sink 52 and a dimple 57.

The engaging sink 52 is a depression or hole within the recess 64 of a size such that the L-shaped engaging hook 50 can fully be contained within the engaging sink 52. An edge of the recess 64 surrounding the engaging sink 52 is formed to snuggly fit between the extended lower portion of the engaging hook 50 and the detachable panel 45, holding the detachable panel 45 fast against a bottom of the recess 64.

The dimple 57 is a depression or hole of a shape and size closely corresponding to the shape and size of the locating shaft 55. When the engaging hook 50 fully engages with the engaging sink 52, the elasticity of the detachable panel 45 causes the locating shaft 55 to enter the dimple 57. The engagement of the locating shaft 55 and the dimple 57 effectively prevents lateral movement of the detachable panel 45 relative to the PDA 40 and the engagement of the engaging hook 50 with the engaging sink 50 effectively prevents movement of the detachable panel 45 in a direction away from the housing 62.

Figure 3:
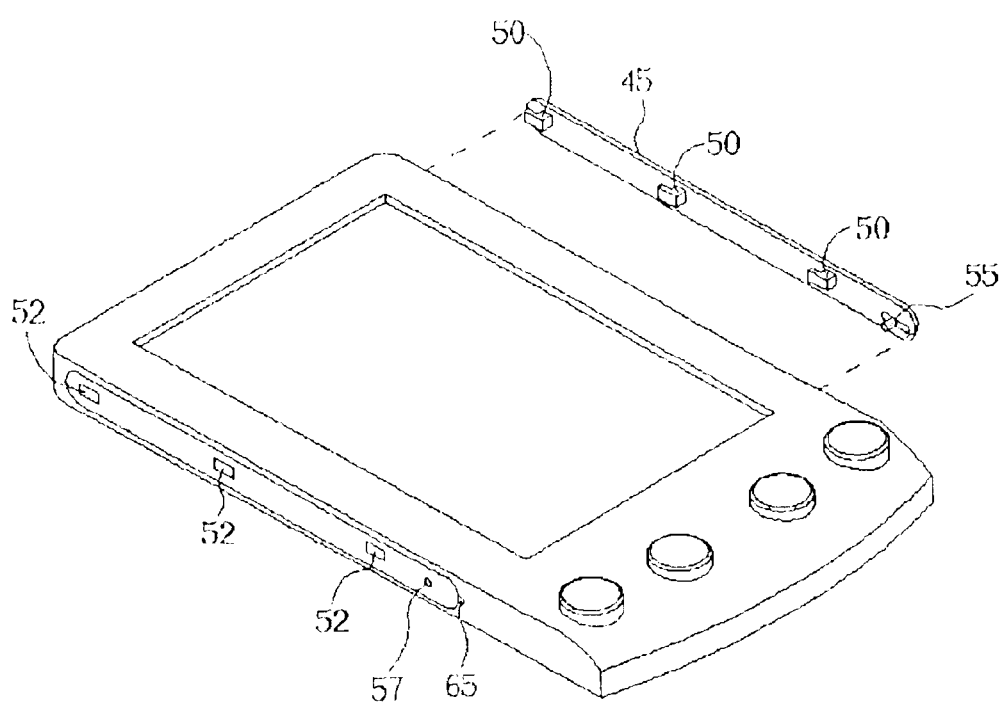
FIGS. 3 and 4 are schematic views of an attachment mechanism for attaching a detachable panel to a housing of a PDA according to the present invention.
Figure 4:
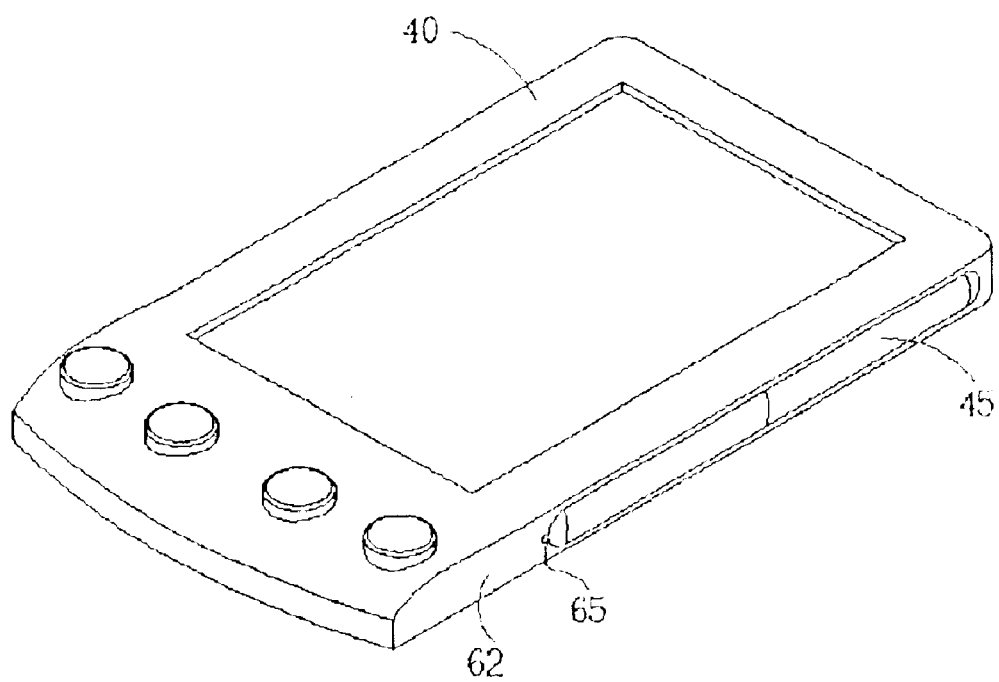

The detachable panel 45 is attached to the POA 40 by sliding the detachable panel 45 along the recess 64 in the direction indicated by the arrow A in FIG. 2. During the sliding process, the engaging hook 50 enters the engaging sink 52 and grips the edge of the recess surface adjacent to the engaging sink 52 similarly to what is done in the prior art mechanism. However, when the engaging hook 50 is fully engaged with the engaging sink 52, the flexible detachable panel 45 causes the locating shaft 55 to enter the dimple 57, thereby temporarily fixing the detachable panel 45 to the housing 62. FIGS. 3 and 4 help to illustrate the arrangement and connectivity of the various parts used in the attachment process.

The major difference between the prior art PDA 10 and the present invention PDA 40 is the use of the locating shaft 55 and the dimple 57 in place of the fixing hook 25 and the fixing sink 27. In the prior art PDA 10, the detachable panel 15 effectively grips the recess 34 between the fixing hook 25 and the engaging hook 20. Because the detachable panel 15 is not completely surrounded by the edges of the recess 34, the grip is necessary to movement of the detachable panel 15 allowing the detachable panel to disengage from the housing 32. This grip also makes the detachable panel 15 difficult to detach from the prior art PDA 10. Additionally, the slope of the trapezoidal fixing hook 25 protrudes beneath the bottom surface of the recess 34 preventing easy withdrawal of the fixing hook 25 from the fixing sink 27.

On the other hand, the present invention uses the locating shaft 55 and the dimple 57, not to grip the recess 65, but to prevent lateral movement of the detachable panel 45. The flanking edges of the recess 65 place additional restrictions on the lateral movement of the detachable panel 45. With the lateral movement of the detachable panel 45 restricted, the engaging hook 50 can function to securely hold the detachable panel 45 fast against the PDA 40 without encumbering the detachment process as seen below.

The housing 62 of the PDA 40 also comprises an open hole 65 adjacent to and in contact with an end of the recess 65 nearest the dimple 57. The open hole 65 is a depression or hole in the housing 62 provided to simplify detachment of the detachable panel 45 from the PDA 45. A tip of an appropriate tapering means 70, such as a stylus of a pen, can be inserted into the open hole 65. The flexibility of the detachable panel allows the stylus to lift an end of the detachable panel 45 closest to the locating shaft 55, thereby lifting the locating shaft 55 out of the dimple 57.

When the locating shaft 55 is lifted out of the dimple 57, the detachable panel 45 can be detached from the housing 62 by sliding the detachable panel 45 in a direction opposite to the arrow A in FIG. 2. When the detachable panel 45 is sliding in the direction opposite to arrow A, the engaging hook 50 is released from the engaging sink 52, completing the detachment process.

A second embodiment of the present invention is nearly identical to the PDA 40 except that there is no recess 64 formed in the housing 62. An engaging sink 50, a dimple 57, and an open hole 65 are all formed on a surface of the housing 62 so that the detachable panel 45 protrudes from the housing 62. The method of attaching and detaching the detachable panel 45 remains the same as in the PDA 40.

In contrast to the prior art, the present invention provides a simplified, one-step attachment procedure for attaching a detachable panel to a PDA 40. Simply slide the detachable panel 45 along the recess 64 until the detachable panel 45 snaps into place. The prior art detachable panel 15 required two steps, sliding the detachable panel 15 and pressing on the detachable panel 15 until the detachable panel 15 deforms adequately to allow the fixing hook 25 to lock into the fixing sink 27.

Removal of the detachable panel has also been simplified. Elasticity in the detachable panel 45 of the present invention allows a tapering means 70, such as a pen stylus, to lift the locating shaft 55 out of the dimple 57 so the detachable panel 45 merely slides off. Conversely, the prior art detachable panel 15 requires the user to deform the detachable panel 15 enough to free the engaging hook 20 from the engaging sink 22, which further allows the user to free the fixing hook 25 from the fixing sink 27.

It is obvious that the present invention has simplified the mechanism and increased convenience to the user.

Those skilled in the art will readily observe that numerous modifications and alterations of the device and method may be made while retaining the teachings of the invention. Accordingly, the above disclosure should be construed as limited only by the means and bounds of the appended claims.

What is claimed is:

1. A PDA (Personal Data Assistant) comprising:
   a housing having a recess in an exterior surface of the housing, the recess having an engaging sink and a dimple; and
   a detachable panel having a hook for locking onto the engaging sink and a cylindrical shaft for engaging with the dimple;
   wherein when the hook engages the engaging sink and the dimple engages the cylindrical shaft, the detachable panel is capable of attaching with the housing: and the cylindrical shaft engaging the dimple is capable of effectively preventing lateral movement of the detachable panel relative to the housing so that the hook is prevented from disengaging from the engaging sink.

2. The PDA of claim 1 wherein the housing further comprises an open hole on one side of the recess while a tapering means inserts into the open hole, capable of removing the cylindrical shaft from the dimple, the hook is prevented from disengaging from the engaging sink.

3. The PDA of claim 1 wherein the cylindrical shaft protrudes from the detachable panel.

4. A PDA (Personal Data Assistant) comprising:
   a housing including an exterior surface having an engaging sink and a dimple; and
   a detachable panel having a hook for locking onto the engaging sink and a cylindrical shaft for engaging with the dimple;
   wherein when the hook engages the engaging sink and the dimple engages the cylindrical shaft, the detachable panel is capable of attaching with the housing; and the cylindrical shaft engaging the dimple is capable of effectively preventing lateral movement of the detachable panel relative to the housing so that the hook is prevented from disengaging from the engaging sink.

5. The PDA of claim 4 wherein the housing further comprises an open hole on one side of the recess while a tapering means inserts into the open hole, capable of removing the cylindrical shaft from the dimple, the hook is prevented from disengaging from the engaging sink.

6. The PDA of claim 4 wherein the cylindrical shaft protrudes from the detachable panel.

* * * * *